June 29, 1937.  A. H. JESSEN  2,085,317
CLUTCH AND OPERATING MECHANISM THEREFOR
Filed March 28, 1932
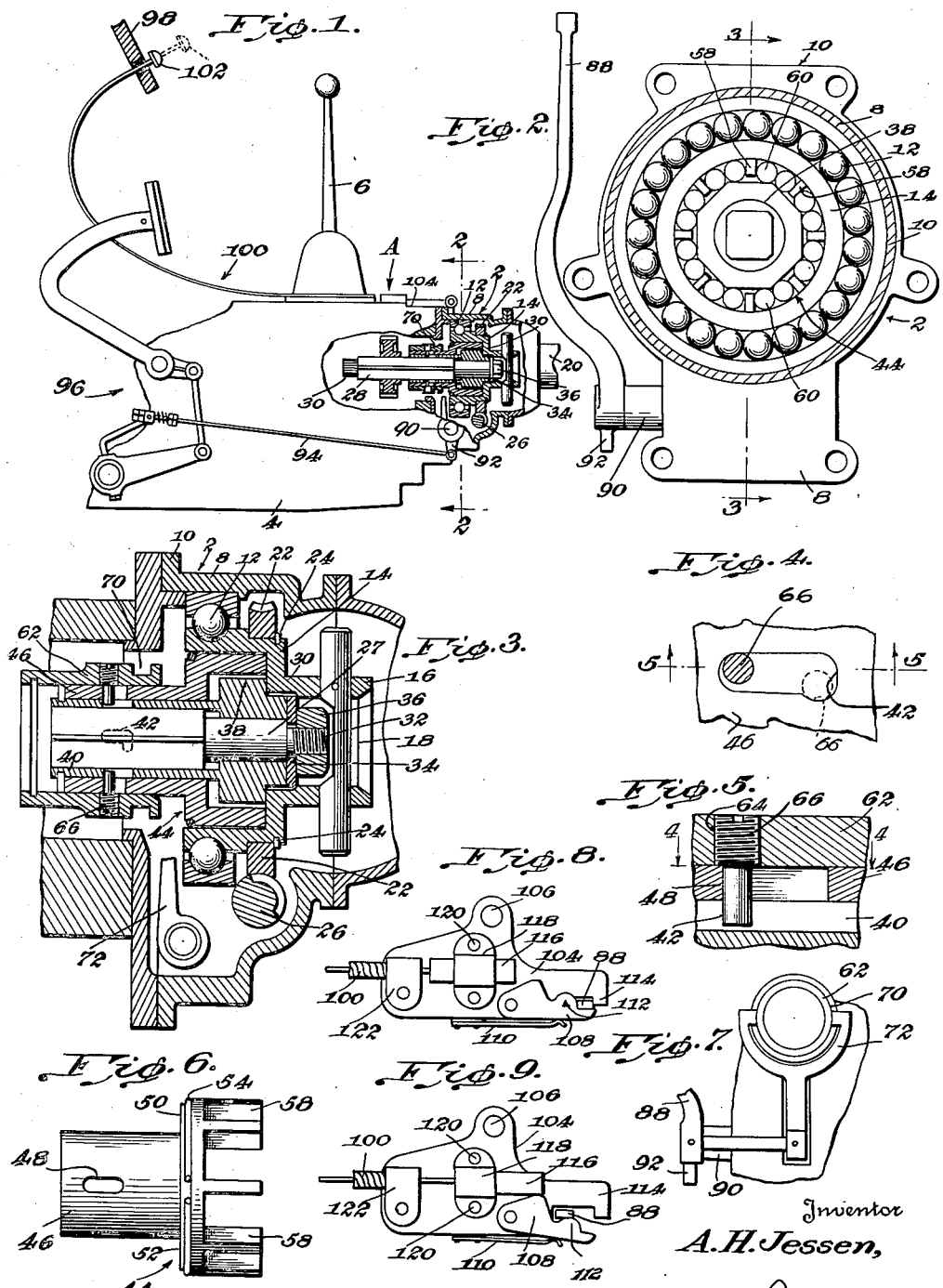
Inventor
A. H. Jessen,
By Clyde L. Rogers
Attorney Patented June 29, 1937

2,085,317

UNITED STATES PATENT OFFICE 2,085,317

CLUTCH AND OPERATING MECHANISM THEREFOR

Arnold H. Jessen, Los Angeles, Calif.

Application March 28, 1932, Serial No. 601,591

7 Claims. (Cl. 192—48)

My invention relates to clutch mechanisms and operating mechanism therefor, and more particularly to those devices which are adapted to be associated with the transmission mechanism of a motor vehicle, whereby the motor thereof may be caused to run idly with respect to the drive shaft of said vehicle, to provide for what is known to the trade as "free wheeling", such, for example, as when said vehicle is coasting as it runs down hill, involving a marked economy in the operation of said vehicle.

It accordingly is an object of my invention to provide a novel form of clutch mechanism, preferably associated as in practice preferred, with one of the movable parts of the transmission mechanism of a motor vehicle, which part may be considered a drive member, and the universal joint, operating the drive shaft of said vehicle, which may be considered as the driven member, said clutch mechanism comprising a suitably mounted outer ring, which may be considered a driven member, and a passive or controlling member, constituting a suitably constructed clutch cage adapted to house a set of clutch devices, which may be of the roller type, and preferably comprising a double roller locking means, one set of such rollers functioning as a locking means for a forward drive, while the other functions as a locking means for a reverse drive.

A further object of my invention is to provide a driving member, which as stated, may be associated with the transmission mechanism, with a suitable cam secured to such driving member, such cam being preferably of polygonal form adapted to engage with and be disengaged from the roller clutch members as stated. Said cam and the shaft to which it is secured is equipped with provision for slight rotary adjustment with respect to the roller cage whereby the cam may engage the rollers to effect clutching action in both directions for conventional drive, or upon such slight turning of the roller cage with respect to the cam, the cam will only clamp the rollers to effect clutching in one direction leaving the driven member free to overrun the driving member as required for free wheeling.

A still further object of my invention is to provide a novel means, preferably in the form of a shiftable collar for shifting the clutch mechanism from conventional drive to free wheeling position or vice versa. Said collar is positioned upon the roller cage and may be provided with one or more pilot pins, suitably mounted upon said collar, and extending through one or more complementary slots in said cage, so said collar may be shifted with respect to said cage. Moreover, said pins extend into one or more key-hole slots in a sleeve surrounding the drive shaft of the transmission mechanism, so that after said collar is shifted, said pins will ride in one portion of said key-hole slots to permit the oscillation of the cage, the amplitude of oscillation being determined by the length of said portion of said key-hole slots.

It is also an object of my invention to provide a novel form of safety clutch locking mechanism for locking in conventional drive, so it will be impossible to shift to free wheeling position until said safety mechanism is unlocked, said mechanism taking the form of a suitable plunger and finger construction, and preferably operable from the dash of the vehicle, by a device known to the trade as a "Bowden wire".

The above, and further objects and advantages of my invention, as will hereinafter more fully appear, I attain by the construction described in the specification, and illustrated on the drawing, forming a part of my application.

Reference is had to the accompanying drawing, in which similar reference characters denote similar parts. In the drawing, Figure 1 is a view partly in elevation and partly broken away in longitudinal vertical section showing the application of my invention to the transmission mechanism of a motor vehicle.

Figure 2 is an enlarged sectional and end view as seen along the line 2—2 of Figure 1 with certain parts behind said line removed to clarify the showing.

Figure 3 is a longitudinal sectional view taken on the line 3—3 of Figure 2.

Figure 4 is an enlarged fragmentary detail plan view of the locking mechanism for locking the clutch cage to the drive shaft, the clearances between the stud 66 and the walls of slot 42 being exaggerated.

Figure 5 is a detail longitudinal section on line 5—5 of Figure 4.

Figure 6 is a detail elevation of the roller clutching cage removed.

Figure 7 is an enlarged detail view showing the yoke device for controlling the clutch mechanism.

Figure 8 is a detail plan view of the control lever operating and locking device looking in the direction of the arrow A Figure 1, the parts being in position for conventional drive; and Figure 9 is a similar view illustrating the parts in position for free wheeling.

More specifically, my invention comprises a clutch mechanism, designated generally by the reference numeral 2, and adapted to be associated in any preferred way with the transmission mechanism, not shown, in the housing 4, which mechanism is operable by the conventional or other gear shift lever 6.

The clutch mechanism 2 comprises a casing or housing 8, connected in any preferred way with the transmission casing 4, as by the flange and bolt means 10, Fig. 2, more particularly, in which casing or housing is positioned any preferred form of anti-friction bearing 12, which may be any in practice suggested.

Mounted for rotation within the bearing 12 is an outer ring or driven member 14, which ring is provided with an extension 16, which preferably forms a mounting for the universal joint 18, which joint also functions as a driven member, adapted to actuate the driven shaft 20, connecting the rear axle of the vehicle, (Fig. 1), which joint may be of any preferred construction; and since same has no particular novelty, except insofar as it enters into the combination with the other parts of my invention, further description and illustration are not deemed necessary.

It will, of course, be understood that the particular association of said universal joint or driven member 18 with the outer ring 14 may be any in practice suggested, and still remain within the province of my invention.

If desired, the outer ring 14 may be provided with a conventional or other gear 22, suitably mounted and held in position, as by a ring 24, which gear is in mesh with a conventional or other worm gear 26, which worm gear is connected to the speedometer shaft whereby the speed may be indicated. Since this construction, also, only enters in combination with the remaining parts of my invention, further description and illustration are not deemed needed.

Mounted for rotation within the outer ring or driven member 14 is a drive shaft 27, associated with the transmission mechanism within the casing 4, which drive shaft is splined as at 28 to receive one of the gears of said transmission mechanism, said shaft being mounted in a set of pilot bearings 30 (Fig. 1, more particularly) so said drive shaft may be rotated in unison with the outer ring 14 or relatively thereto, as will hereinafter be more particularly described.

Since said pilot bearings 30 and the gears of the transmission mechanism enter only in combination with my novel clutch and free wheeling devices, further description and illustration are also not deemed necessary.

Associated with the drive shaft 27, which may have a reduced portion 32 to receive a nut 36, abutting against a washer 34, or other construction to hold the shaft 27 in detachable relation with respect to the apparatus, is a cam 38, which may be of polygonal shape (Fig. 2), said cam being associated with said shaft in any manner in practice preferred, so long as said cam continually rotates with said shaft, said cam forming one of the active parts of my novel clutch mechanism.

If desired, the cam 38 may have an extension, collar or sleeve 40 (Figs. 3, 4, and 5, more particularly), rigidly associated therewith as preferred, and mounted upon the splines 28 of the shaft 27, said extension being provided with a set of locking means 42, of any preferred number, preferably in the form of a key-hole slot, the purpose of which will be presently explained. The rigidity of said sleeve 40, when mounted upon said shaft 27, is accomplished by screwing home the nut 36.

Suitably mounted upon the extension 40 is a clutch cage 44, illustrated in detail in Fig. 6, which cage is provided with a suitable collar, extension or sleeve 46, which collar, extension or sleeve is provided with through slots 48 (Figs. 5 and 6), also for a purpose presently to be described.

The cage 44 is also provided with an angular extension 50 formed with a peripheral groove 52 receiving a snap spring 54 in position for frictional engagement with the inner surface of the outer ring 14. This spring is for the purpose of creating frictional engagement between the roller cage 44 and the outer ring 14 sufficient to exceed the friction upon the roller cage engendered by the action of the cam,—i. e., so that the cam 38 will not hold the roller cage and rollers from movement with respect to it for clutching engagement when the relative movement between driving and driven parts takes place. To hold the ring 54 against displacement it may have a usual inwardly bent extension engaging a hole in the extension 50 to anchor said ring with respect to the cage 44.

As seen more particularly in Figs. 2 and 6, the extension 50 has projecting therefrom a requisite number of sector shaped projections 58, between which are positioned the clutch devices 60, which may be of any preferred number, and will function in the manner presently to be described, said devices being preferably in the form of rollers, although other devices may be used instead.

The sector projections 58 and extension 50 as well as the clutch devices 60 are housed at all times when the device is assembled entirely within the outer ring 14 and the cage 44 is only shifted to position for conventional running or free wheeling as may be desired by oscillation of the same with respect to the cam 38. As before stated, the relative oscillation of the roller cage 44 with respect to the cam is slight. When said cam is released from locked or driving engagement, to wit, the engagement of the rollers with either apex of said cam according to the direction of rotation, a relative oscillation through a small amplitude is permitted, depending upon the length of the transverse part of the keyhole slots 42. In such case, the cam being free, there will be a relative movement in one direction of rotation or the other until apices of said cam are engaged by the rollers 60.

For the purpose of manipulating the apparatus so that conventional drive may be changed to free wheeling or vice versa, there is mounted upon the extension or collar 46 a shiftable collar or sleeve 62 (Figs. 3 and 5, more particularly), which collar or sleeve may be provided with a set of screw-threaded holes 64, which holes are complementary to and are adapted to align with the holes or slots 48 in the extension 46 and the keyhole slots 42 in the collar or sleeve 40. (Fig. 5, more particularly.)

Positioned within the holes 64 and adapted to extend through the holes 48 and into the keyhole slots 42, are screw or pilot pins 66, each of said pins preferably having an implement engaging kerf so said pins may be screwed home, thus providing a means, when the collar 62 is shifted, as presently to be explained, which will permit a relative oscillation between the cam and the roller cage so that the assembly will be locked by means of the keyhole slots 42 or unlocked to provide for free wheeling, as desired—i. e., when the pins 66 are located so as to be movable in the angular portions of the slots 42 (at the right of Figure 4) the rollers 60 which operate freely on the cam faces of the cam 38 during the relative oscillation may be shifted to engage either apex of said faces as required for conventional drive.

The specific shifting means for operating the collar or sleeve 62 is more particularly shown in Fig. 7, which discloses that the said shifting collar 62 is provided with a peripheral groove 70, (see also Figs. 1 and 3), which groove is adapted to be more or less loosely engaged (to permit rotation of the collar 62) by a suitable yoke 72, adapted to be actuated in the manner hereinafter more particularly described.

It has been found in practice that lubricating conditions, such as encountered in cold weather, and when the lubricant is heavy, causes trouble with free wheeling devices heretofore proposed.

It accordingly is a very important feature of my invention to correct said trouble, which may be accomplished in a number of ways, one of which is the snap ring 54, positioned within the groove 52, said ring producing a frictional engagement between the outer ring 14 and the cage 44, by engaging the inner wall of said ring, whereby clutch engagement and disengagement is insured, irrespective of said lubricating conditions.

Figure 4 shows in full lines the pin 66 in position for free wheeling. From this figure it will be noted that the pin 66 is of substantially less dimension than the width of the longitudinal portion of the slot 42. This lost motion fit between said pin and said slot is such that when the pin is at or near the upper side of said slot as seen in Figure 4, the rollers 60 clutch the came for driving engagement, while when said pin engages the lower side of said slot the roller cage is turned to position for free wheeling. Upon moving the pin 66 to the right hand end of the slot 42, by manipulation of the collar 62, i. e., into alignment with the transverse extension thereof, the pin 66 is permitted to move farther downward as viewed in said Figure 4 so as to effect clutching engagement of the roller with the other sides of the cam apices so as to effect driving engagement and thus obtain conventional drive. It will be understood that with the described construction when the pin 66 is located in the left hand or longitudinal (Figure 4) portion of the slot 42, the roller cage is permitted a relative oscillation from a position where the rollers engage the apices of the cam at one side when the pin 66 is at or near the top of said slot as seen in said figure, to a position where the rollers are disengaged from the cam apices, —with the pin 66 engaging the lower side of the slot 42. When, however, the pin 66 is adjusted by actuation of the collar 62 so that said pin is in alignment with the transverse portion of the slot 42, the pin 66 is permitted to move farther and hence the roller cage to oscillate more so that the rollers thereof engage the other side apices of the cam to effect driven engagement which is thus in both directions, i. e., conventional drive.

When the rollers 60 of the cage 44 are released from the cam by shifting the collar 62 so that the pins 66 will be in the position of the full lines in Fig. 4 in the key hole slots 42, said rollers will lock with the cam for free wheeling, as previously explained.

The double roller locking mechanism, as hereinbefore explained, functions to provide a cam lock for both forward and reverse drive with provision for free wheeling, one set of said rollers engaging the alternate apices of the cam 38 when the rotation is in one direction, and the other apices when the rotation is in a contrary direction. This eliminates all back lash when in conventional drive, prevents excessive pressure upon the device, and at the same time permits a much quicker lock in either direction than in similar devices heretofore proposed.

In my novel device the entire action of known devices is reversed, and this is done by causing the shiftable collar 62 and the roller cage 44 to operate in unison at all times, the cam 38 being released for free wheeling as desired.

Any suitable means may be provided for operating the yoke 72 to change from conventional running to free wheeling or vice versa. I prefer, however, to use an operating lever 88, suitably pivoted to the casing 8, as at 90, Figs. 1, 2, and 7, which lever has an arm 92, in pivotal engagement with a rod 94 (Fig. 1), in adjustable engagement at its other end with the foot pedal mechanism 96. Since this foot pedal mechanism is more or less conventional, further description and illustration are not deemed necessary. This construction provides a means for operating the clutch mechanism by the foot pedal.

To control the operation of the clutch mechanism from the dash 98 (Fig. 1), an operating device 100, known to the trade as a "Bowden wire", with operating knob 102, may be provided; the conventional running position of said knob being shown in full lines, while the dotted lines show the free wheeling position. This construction, of course, is utilized only to lock the mechanism in conventional drive, as a safety means.

As seen more particularly in Figs. 8 and 9, a suitable support or plate 104, bolted or otherwise secured to the transmission casing 4, as by the holes 106, may be provided, and on said support is pivotally mounted a dog or finger 108, its action being opposed by a suitable spring 110, which dog has a cam projection and cut-out assembly 112, the operating lever 88 being adapted to be moved past said cam assembly in a cut-out portion 114.

The Bowden wire 100 is connected to a reciprocating plunger 116, mounted in a suitable guide 118, bolted or otherwise secured to the support 104, as indicated by the reference numeral 120, a suitable guide 122 being also provided for the wire 100. As shown in Figure 8 the lever 88 is locked by the dog 108 at its limit of right hand movement and hence the collar 62 and pin 66 are also at their limit of right hand movement which is the position for conventional drive as already described. When the knob 102 is operated so as to move the plunger 116 to the position shown in Figure 9 for tripping the dog 108, the lever 88 is permitted to move to the left as seen in said figure, thus moving the collar 62 and the pin 66 to the left, i. e., out of line with the transverse portion of the slot 42, i. e., to free wheeling position.

In accordance with the provisions of the patent statutes, I have described the principle of operation of my invention, together with the apparatus which I now consider the best embodiment thereof; but I desire to have it understood that the apparatus shown is only illustrative, and that the invention can be carried out by other means.

I claim as my invention:

1. A clutch cage adapted for use in connection with a motor vehicle free wheeling device comprising a hub, an annular extension on said hub, said extension being provided with a peripheral groove, a set of sector shaped projections on said extension for housing a set of clutch devices, and an annular spring member detachably associated with said groove, one end of which is adapted to be anchored to said extension.

2. In a free wheeling device, rotatable drive and driven members, a cam on said drive member, a roller cage on said drive member, a shiftable collar mounted upon said cage, said cage being provided with one or more through slots, and said drive member being provided with one or more key-hole slots, at least one pilot pin associated with said collar and extending through the slot or slots in said cage and into said key-hole slot or slots, whereby when said collar is shifted in one direction the cage is released from the cam in one direction to permit free wheeling, and when shifted in the other direction the cage is permitted to move with respect to the cam in both directions, by reason of the movement of said pilot pin in said key-hole slot.

3. Power transmitting mechanism comprising driving and driven members formed to provide between them a space for the operation of clutch elements, one of said members equipped with a cam projection extending into said space, clutch elements disposed closely adjacent each other and to operate in said space, with one thereof at each side of said cam projection, and an adjustable control device closely engaging and accurately controlling the location of said clutch elements in said space adapted to locate them so that they will lock said driving and driven members together against relative movement in either direction, or to locate them so as to permit a one-way movement of said driven member with respect to the driving member, at will.

4. Power transmitting mechanism as set forth in claim 3, wherein said clutch elements are formed as rollers with a pair thereof adapted respectively to engage opposite sides of said cam projection, and with said control device closely engaging the outer sides of said pair of rollers.

5. Power transmitting mechanism as set forth in claim 3, wherein said driving and driven members are formed to provide between them an annular space with pairs of said clutch elements disposed in said annular space throughout the extent thereof, and with multiple cam projections each adapted to be engaged at opposite sides by the respective clutch elements of said pairs of clutch elements.

6. Power transmitting mechanism as set forth in claim 3, wherein said adjustable control device is formed as an angularly adjustable cage with fingers projecting between pairs of clutch elements and closely engaging the same to control the position thereof.

7. Power transmitting mechanism as set forth in claim 3, wherein said adjustable control device is formed as an angularly adjustable cage, and with a longitudinally adjustable sleeve having a pin and slot connection with said cage formed and adapted to determine the angular setting of said cage.

ARNOLD H. JESSEN.